United States Patent
Hashimoto et al.

(10) Patent No.: US 9,958,063 B2
(45) Date of Patent: May 1, 2018

(54) HYDRAULIC CONTROL DEVICE AND METHOD FOR CONTROLLING THE SAME

(71) Applicant: JATCO Ltd, Fuji-shi, Shizuoka (JP)

(72) Inventors: Yasuyuki Hashimoto, Atsugi (JP);
Seiichiro Takahashi, Isehara (JP);
Tomoaki Honma, Isehara (JP);
Tomoaki Kabe, Nagoya (JP);
Nobuhiko Morifuji, Okazaki (JP);
Nobuhide Kato, Kariya (JP); Hitoshi Goka, Miyoshi (JP); Koichi Sugita, Okazaki (JP)

(73) Assignee: JATCO Ltd, Fuji-Shi (JP)

( * ) Notice: Subject to any disclaimer, the term of this patent is extended or adjusted under 35 U.S.C. 154(b) by 81 days.

(21) Appl. No.: 15/117,339

(22) PCT Filed: Feb. 16, 2015

(86) PCT No.: PCT/JP2015/054072
§ 371 (c)(1),
(2) Date: Aug. 8, 2016

(87) PCT Pub. No.: WO2015/125718
PCT Pub. Date: Aug. 27, 2015

(65) Prior Publication Data
US 2016/0356380 A1    Dec. 8, 2016

(30) Foreign Application Priority Data

Feb. 20, 2014  (JP) .................................. 2014-030506

(51) Int. Cl.
*F16H 59/00*    (2006.01)
*F16H 61/00*    (2006.01)
(Continued)

(52) U.S. Cl.
CPC ... *F16H 61/66272* (2013.01); *F16H 61/0021* (2013.01)

(58) Field of Classification Search
CPC ......... F16H 61/66259; F16H 61/66272; F16H 61/0021; F16H 61/662; F16H 2061/6608
(Continued)

(56) References Cited

U.S. PATENT DOCUMENTS

| 2 A | * | 7/1836 | Goulding | .................. | C02F 1/00 |
|---|---|---|---|---|---|
| | | | | | 57/58.49 |
| 4,510,822 A | * | 4/1985 | Yamamuro | ............. | F16H 45/02 |
| | | | | | 192/3.31 |

(Continued)

FOREIGN PATENT DOCUMENTS

| JP | 2001-235013 A | 8/2001 |
|---|---|---|
| WO | WO-2007/013792 A1 | 2/2007 |
| WO | WO-2009/003511 A1 | 1/2009 |

*Primary Examiner* — Henry Y Liu
(74) *Attorney, Agent, or Firm* — Foley & Lardner LLP (57) ABSTRACT

A hydraulic control device controls hydraulic pressure supplied to a continuously variable transmission. The hydraulic control device includes a pressure regulating valve, a solenoid valve configured to control the pilot pressure, line pressure control means, and hydraulic control means. The pressure regulating valve includes an input port to which line pressure is input, an output port configured to supply an oil chamber of a second pulley with a second pulley pressure, a drain port configured to discharge the second pulley pressure from the oil chamber, and a spool moving according to pilot pressure to regulate the second pulley pressure. The line pressure control means is configured to control the line pressure on the basis of the second pulley pressure and first pulley pressure of first pulley. The hydraulic control means is configured to temporarily change the pilot pressure from set pressure to configure the line pressure identical to the second pulley pressure.

12 Claims, 4 Drawing Sheets

(51) Int. Cl.
*F16H 63/00* (2006.01)
*F16H 61/662* (2006.01)

(58) Field of Classification Search
USPC .......................................................... 474/28
See application file for complete search history.

(56) References Cited

U.S. PATENT DOCUMENTS

| | | | | |
|---|---|---|---|---|
| 4,857,034 A * | 8/1989 | Kouno | ................... | B60W 30/18 |
| | | | | 474/28 |
| 5,720,691 A * | 2/1998 | Ogawa | .............. | F16H 61/66259 |
| | | | | 474/28 |
| 7,677,997 B2 * | 3/2010 | Hiramatsu | .............. | F16H 55/56 |
| | | | | 137/112 |
| 7,931,551 B2 * | 4/2011 | Katou | ............... | F16H 61/66272 |
| | | | | 474/18 |
| 7,951,026 B2 * | 5/2011 | Soga | ................... | F16H 61/0021 |
| | | | | 474/28 |
| 7,955,202 B2 * | 6/2011 | Wagner | ................... | F16H 61/12 |
| | | | | 474/28 |
| 8,012,051 B2 * | 9/2011 | Soga | ........................ | F16H 61/12 |
| | | | | 474/110 |
| 8,038,553 B2 * | 10/2011 | Soga | .................. | F16H 61/66272 |
| | | | | 474/18 |
| 8,548,698 B2 * | 10/2013 | Long | .................... | F16H 61/0021 |
| | | | | 701/58 |
| 8,734,277 B2 * | 5/2014 | Willeke | .............. | F15B 13/0433 |
| | | | | 137/624.27 |
| 8,798,877 B2 * | 8/2014 | Ayabe | ............... | F16H 61/66259 |
| | | | | 474/18 |
| 8,914,206 B2 * | 12/2014 | Hattori | .................... | F16H 9/125 |
| | | | | 701/51 |
| 8,924,104 B2 * | 12/2014 | Natori | ............... | F16H 61/66272 |
| | | | | 701/51 |
| 8,986,164 B2 * | 3/2015 | Morino | ............... | F16H 61/0021 |
| | | | | 477/151 |
| 9,316,239 B2 * | 4/2016 | Van Wijk | ................. | F15B 21/00 |
| 9,488,268 B2 * | 11/2016 | Yamada | ................. | F16H 61/0021 |

* cited by examiner

HYDRAULIC CONTROL DEVICE AND METHOD FOR CONTROLLING THE SAME

TECHNICAL FIELD

The present invention relates to a hydraulic control device.

BACKGROUND ART

JP2001-235013A discloses a hydraulic control device for vehicle automatic transmission that prevents a hydraulic lock in a signal pressure oil passage at a low temperature to improve responsiveness of a hydraulic control valve.

In JP2001-235013A, a hydraulic-lock-preventing oil passage is disposed. The hydraulic-lock-preventing oil passage drains a part of signal pressure to a signal pressure oil passage, which supplies signal pressure from a linear solenoid valve to a signal oil chamber in a hydraulic control valve. This ensures preventing the hydraulic lock and a quick communication between an output port and a drain port.

SUMMARY OF INVENTION

With a both-pressure-regulating type continuously variable transmission that regulates primary pressure and secondary pressure with line pressure as source pressure and that can reduce the line pressure, discharge pressure of an oil pump that generates the line pressure can be reduced. This ensures improving fuel efficiency of a driving source that drives the oil pump. Configuring the line pressure and higher pulley pressure among the primary pressure and the secondary pressure to be identical ensures further improving the fuel efficiency of the driving source, which drives the oil pump.

To configure the line pressure and, for example, the secondary pressure to be identical, opening areas of an input port to which the line pressure is input and an output port that supplies a secondary pulley with the secondary pressure are maximized. Accordingly, without reduction in line pressure in a pressure regulating valve, the line pressure is supplied as the secondary pressure to a secondary pulley cylinder chamber via the output port. To set the pressure regulating valve from the pressure regulating state to the identical pressure state where the line pressure is identical to the secondary pressure, the line pressure is decreased to the secondary pressure or less, thus configuring the identical pressure. In the pressure regulating state, while an actual secondary pressure is higher than the instructed secondary pressure, a spool of the pressure regulating valve has a pressure regulating point on a drain side. Even if the line pressure is decreased in the state, the input port and the output port are not communicated. Especially, in the case of low oil temperature and high oil viscosity, an operation of the spool is slow and therefore time to remove a stuck state of the pressure regulating valve lengthens, failing to quickly increase the opening areas of the ports.

In contrast to this, applying the signal pressure to the spool of the pressure regulating valve causes the spool to actuate and ensures increasing the opening areas of the ports.

However, increasing the opening areas of the ports while a pressure difference between the line pressure and the secondary pressure is large increases a variation in the secondary pressure, generating a shift shock. Accordingly, it is preferable to communicate the input port with the output port after the pressure difference between the line pressure and the secondary pressure sufficiently decreases. By disposing a line pressure sensor, which detects the line pressure, the identical pressure state of the line pressure to the secondary pressure can be sensed.

However, in some cases, without use of the line pressure sensor, the line pressure is estimated on the basis of signals from a primary pressure sensor, which detects the primary pressure, and a secondary pressure sensor, which detects the secondary pressure. With such continuously variable transmission, to configure the line pressure at the pressure identical to the secondary pressure while the input port and the output port are not communicated, even if the line pressure actually reduces according to an instructed pressure, estimated line pressure is determined as not being reduced according to the instructed pressure. This further reduces the instructed pressure for line pressure and therefore further reduces the line pressure, possibly reducing the line pressure more than the secondary pressure. Afterwards, when the stuck state of the pressure regulating valve is removed and the opening areas of the ports increase, the secondary pressure rapidly reduces according to the pressure difference between the secondary pressure and the line pressure, the continuously variable transmission shifts, possibly causing a large shift shock. Thus, a delay of timing to increase the opening areas of the ports possibly causes the large shift shock.

The present invention has been made to solve the problem, and an object of the present invention is to restrain a shift shock due to a sudden change in a secondary pressure in the case where a line pressure and, for example, a secondary pressure are configured to be identical without a line pressure sensor.

A hydraulic control device according to a certain aspect of the present invention is a hydraulic control device for controlling hydraulic pressure supplied to a continuously variable transmission configured by stretching a power transmission member between a first pulley and a second pulley, the hydraulic control device including a pressure regulating valve that includes an input port to which line pressure is input, an output port, a drain port, and a spool, the output port being configured to supply an oil chamber of the second pulley with a second pulley pressure, the drain port being configured to discharge the second pulley pressure from the oil chamber, the spool moving according to pilot pressure to regulate the second pulley pressure, a solenoid valve configured to control the pilot pressure, line pressure control means configured to control the line pressure on the basis of the second pulley pressure and first pulley pressure of the first pulley, and hydraulic control means configured to temporarily change the pilot pressure from set pressure to configure the line pressure identical to the second pulley pressure.

A hydraulic control method according to another aspect of the present invention is a control method for a hydraulic control device for controlling hydraulic pressure supplied to a continuously variable transmission configured by stretching a power transmission member between a first pulley and a second pulley. The hydraulic control device includes a pressure regulating valve including an input port to which line pressure is input, an output port, a drain port, and a spool, the output port being configured to supply an oil chamber of the second pulley with a second pulley pressure, the drain port being configured to discharge the second pulley pressure from the oil chamber, the spool moving according to pilot pressure to regulate the second pulley pressure, and a solenoid valve configured to control the pilot pressure. The control method controls the line pressure on the basis of the second pulley pressure and first pulley pressure of the first pulley, the control method temporarily changing the pilot pressure from set pressure to configure the line pressure identical to the second pulley pressure.

These aspects ensures restraining the shift shock due to the sudden change in the secondary pressure in the case where the line pressure and the second pulley pressure are configured to be an identical pressure without the line pressure sensor.

DESCRIPTION OF EMBODIMENTS

Figure 1:
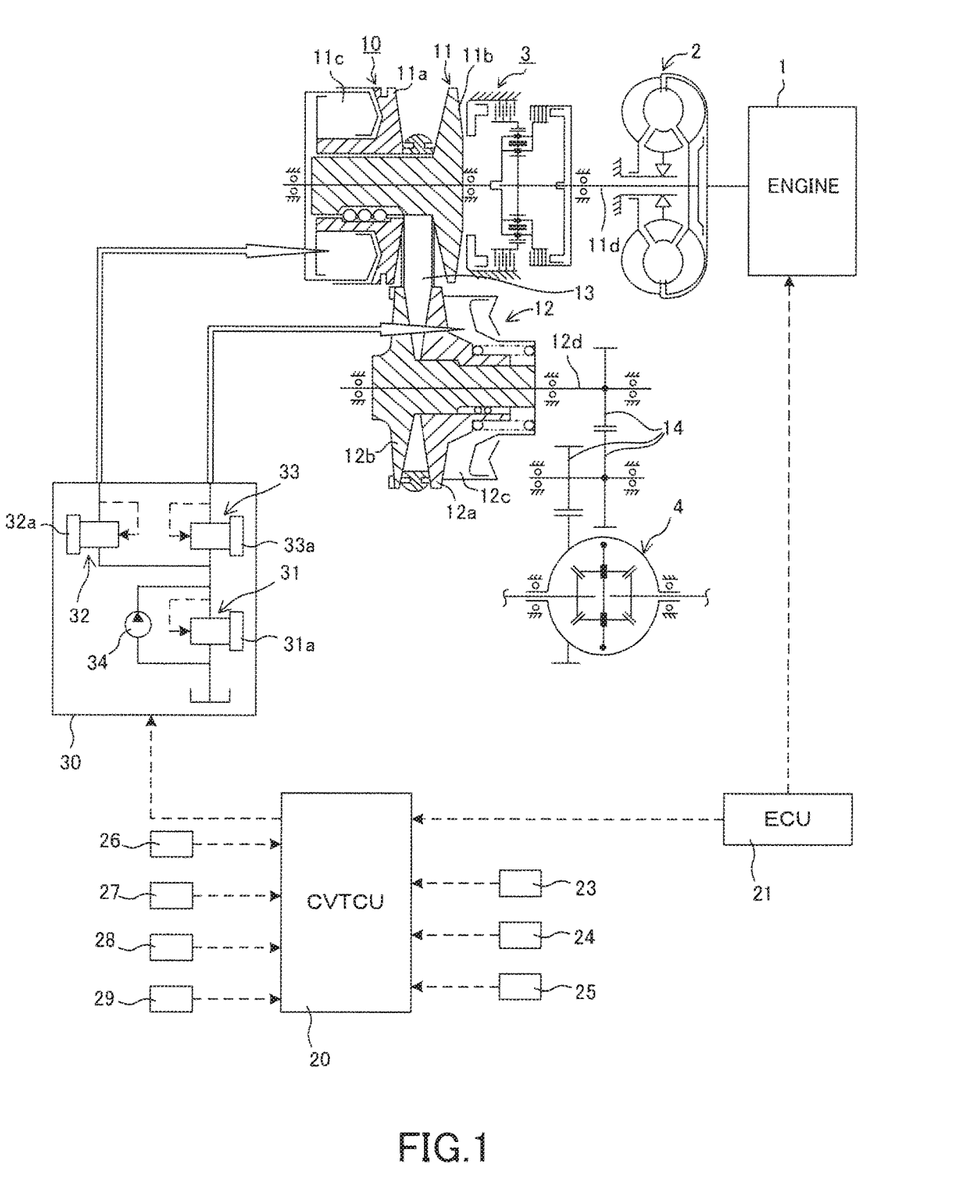
FIG. 1 is a schematic configuration diagram illustrating a hydraulic control device of a belt-type continuously variable transmission.

The following describes an embodiment of the present invention in detail with reference to the accompanying drawings and a similar description. FIG. 1 is a schematic configuration diagram illustrating a hydraulic control device of a belt-type continuously variable transmission 10 according to the embodiment. The belt-type continuously variable transmission (hereinafter referred to as a "continuously variable transmission") 10 includes a primary pulley 11, a secondary pulley 12, a belt 13, a CVT control unit 20 (hereinafter referred to as a "CVTCU"), and a hydraulic control unit 30. The continuously variable transmission 10 is a both-pressure-regulating continuously variable transmission.

It should be noted that, a speed ratio of the continuously variable transmission 10 is a value found by dividing a rotation speed of the primary pulley 11 by a rotation speed of the secondary pulley 12. A large speed ratio is referred to as "Low," and a small speed ratio is referred to as "High." A change in the speed ratio to the Low side is referred to as a downshift, and a change in the speed ratio to the High side is referred to as an upshift.

The primary pulley 11 includes a fixed conical plate 11b and a movable conical plate 11a. The fixed conical plate 11b rotates integrally with an input shaft 11d. The movable conical plate 11a is disposed opposed to the fixed conical plate 11b to form a V-shaped pulley groove and is axially displaceable by hydraulic pressure acting on a primary pulley cylinder chamber 11c. The primary pulley 11 is coupled to an engine 1 via a forward-reverse switching mechanism 3 and a torque converter 2, which includes a lock-up clutch, thereby a rotation of the engine 1 is input to the primary pulley 11.

The belt 13 is wound around and hung to the primary pulley 11 and the secondary pulley 12 to transmit a rotation of the primary pulley 11 to the secondary pulley 12.

The secondary pulley 12 includes a fixed conical plate 12b and a movable conical plate 12a. The fixed conical plate 12b rotates integrally with an output shaft 12d. The movable conical plate 12a is disposed opposed to the fixed conical plate 12b to form a V-shaped pulley groove and is axially displaceable according to hydraulic pressure acting on a secondary pulley cylinder chamber 12c. The secondary pulley 12 is coupled to a differential 4 via an idler gear 14 and an idler shaft to output a rotation to this differential 4.

The rotation of the engine 1 is input to the continuously variable transmission 10 via the torque converter 2 and the forward-reverse switching mechanism 3 and then is transmitted from the primary pulley 11 to the differential 4 via the belt 13 and the secondary pulley 12.

The CVTCU 20 refers to a gear shift line preliminary stored on the basis of signals from an inhibitor switch 23, an accelerator pedal stroke amount sensor 24, an oil temperature sensor 25, a primary pulley rotation speed sensor 26, a secondary pulley rotation speed sensor 27, a primary pressure sensor 28, a secondary pressure sensor 29, and a similar sensor; and input torque information from an engine control unit (ECU) 21 to decide a speed ratio and transmits a command to the hydraulic control unit 30 to control the continuously variable transmission 10.

The hydraulic control unit 30 reactively operates on the basis of the command from the CVTCU 20. The hydraulic control unit 30 supplies and drains the hydraulic pressure to the primary pulley 11 and the secondary pulley 12 to move the movable conical plate 11a and the movable conical plate 12a back and forth in a rotation axis direction. This changes the speed ratio of the continuously variable transmission 10.

The hydraulic control unit 30 includes a regulator valve 31, a pressure regulating valve 32, and a pressure regulating valve 33.

The regulator valve 31 includes a solenoid valve 31a to regulate hydraulic pressure fed from a hydraulic oil pump 34 to a predetermined line pressure according to a command (for example, a duty signal) from the CVTCU 20.

The pressure regulating valve 32 is a control valve that controls the line pressure regulated by the regulator valve 31 to a desired primary pressure. The pressure regulating valve 32 creates primary pressure from the line pressure on the basis of pilot pressure, which is created by a solenoid valve 32a according to the command (for example, the duty signal) from the CVTCU 20.

The pressure regulating valve 33 is a control valve that controls the line pressure regulated by the regulator valve 31 to a desired secondary pressure. The pressure regulating valve 33 creates secondary pressure from the line pressure on the basis of the pilot pressure, which is created by a solenoid valve 33a according to the command (for example, the duty signal) from the CVTCU 20. The following describes the pressure regulating valve 33 with reference to FIG. 2.

Figure 2:
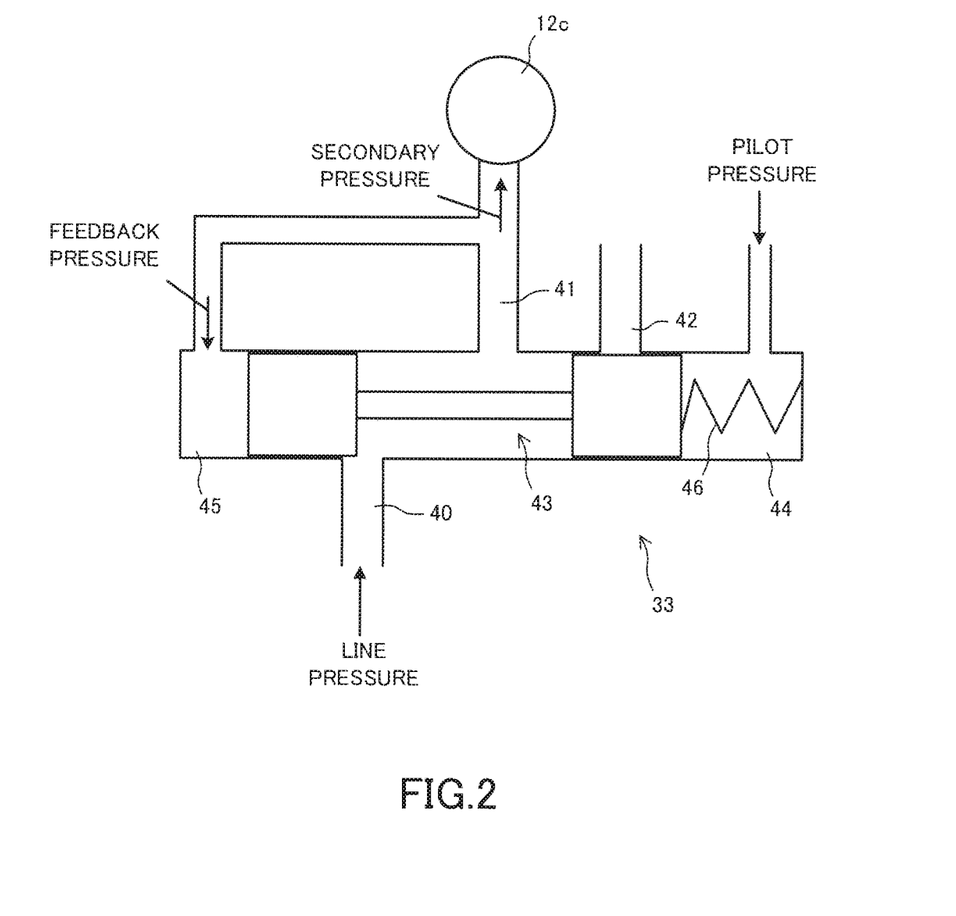
FIG. 2 is a schematic configuration diagram of a pressure regulating valve.

An input port 40 to which the line pressure is input, an output port 41 that supplies the secondary pulley cylinder chamber 12c with the secondary pressure, and a drain port 42 that discharges the secondary pressure from the secondary pulley cylinder chamber 12c are formed in the pressure regulating valve 33. The pressure regulating valve 33 includes a spool 43 that changes a circulation area of a flow passage formed between the output port 41 and the input port 40 or the drain port 42. Changing the opening area of the input port 40 or the drain port 42 by the spool 43 in the pressure regulating valve 33 changes the circulation area of the flow passage, which is formed between the output port 41 and the input port 40 or the drain port 42.

The pressure regulating valve 33 forms a pilot chamber 44 on one end part in a moving direction of the spool 43 and forms a feedback chamber 45 on the other end part. To the pilot chamber 44, the pilot pressure, which is created by the solenoid valve 33a by the command from the CVTCU 20, is input. The pilot chamber 44 includes a spring 46 that biases the spool 43 to the feedback chamber 45 side. To the feedback chamber 45, a part of the secondary pressure is input as the feedback pressure.

The spool 43 moves according to pressing force by the spring 46 and the pilot pressure and pressing force by the feedback pressure to change the circulation area of the flow passage, which is formed between the input port 40 and the output port 41, and the circulation area of the flow passage, which is formed between the output port 41 and the drain port 42. The pressing force by the spring 46 and the pilot pressure larger than the pressing force by the feedback pressure moves the spool 43 to the feedback chamber 45 side. This increases the circulation area of the flow passage formed between the input port 40 and the output port 41 and the line pressure is regulated according to the circulation area, thus supplying the line pressure as the secondary pressure to the secondary pulley cylinder chamber 12c. The pressing force by the spring 46 and the pilot pressure smaller than the pressing force by the feedback pressure moves the spool 43 to the pilot chamber 44 side. This increases the circulation area of the flow passage formed between the output port 41 and the drain port 42 and discharges the hydraulic pressure from the secondary pulley cylinder chamber 12c, thus reducing the secondary pressure.

The continuously variable transmission 10 of this embodiment is a both-pressure-regulating system; however, an actual primary pressure and an actual secondary pressure possibly vibrate with respect to the instructed pressure for primary pressure and the instructed pressure for secondary pressure, vibrating (changing) the speed ratio. The cause of this situation is variations of the actual primary pulley pressure and the actual secondary pressure, namely, changes in amounts of oil in the primary pulley cylinder chamber 11c and the secondary pulley cylinder chamber 12c. Quickly converging the changes in these amounts of oil ensures restraining the vibration of the speed ratio. To quickly converge the change in the amount of oil, the following is considered. The opening area of the input port 40 is maximized so as to maximize the circulation area of the flow passage formed between the input port 40 and the output port 41 in the pressure regulating valve 33 to increase an amount of supplied oil to the secondary pulley cylinder chamber 12c and an identical pressure control that configures the line pressure and the secondary pressure to be identical is performed. That is, the use of the both-pressure-regulating continuously variable transmission 10 as a one-side regulating system that does not reduce the line pressure and directly supplies the line pressure to the secondary pulley cylinder chamber 12c is considered.

The line pressure is source pressure of the primary pressure and the secondary pressure; therefore, usually, considering the variation, the line pressure is set higher than the primary pressure and the secondary pressure. However, execution of the identical pressure control ensures reducing the line pressure compared with the case where the identical pressure control is not performed. This allows reducing the discharge pressure of the hydraulic oil pump 34, thereby ensuring improving a fuel efficiency of a driving source, for example, the engine 1, to drive the hydraulic oil pump 34.

To configure the line pressure and the secondary pressure to be identical, an increase in the circulation area of the flow passage formed between the input port 40 and the output port 41 with the large pressure difference between the line pressure and the secondary pressure suddenly changes the secondary pressure, increasing the shift shock. Accordingly, it is necessary to increase the circulation area of the flow passage formed between the input port 40 and the output port 41 with the small pressure difference between the line pressure and the secondary pressure, and it is necessary to sense the small pressure difference between the line pressure and the secondary pressure.

This embodiment does not include the line pressure sensor; therefore, the line pressure cannot be directly detected. The line pressure is estimated on the basis of the primary pressure, which is detected by the primary pressure sensor 28, and the secondary pressure, which is detected by the secondary pressure sensor 29.

However, assume the case that the input port 40 and the output port 41 are not communicated (The circulation area is zero.) by the spool 43 but the output port 41 and the drain port 42 are communicated, or the circulation area of the flow passage formed between the input port 40 and the output port 41 is small. Then, even if the instructed pressure for line pressure is reduced to reduce the line pressure, the secondary pressure may not be reduced in accordance with the reduction in line pressure. Therefore, it is determined that the line pressure estimated on the basis of the secondary pressure does not reduce or the reduction is slow. This further reduces the instructed pressure for line pressure and the line pressure possibly becomes lower than the secondary pressure, possibly increasing the pressure difference between the line pressure and the secondary pressure.

With this state, increasing the circulation area of the flow passage formed between the input port 40 and the output port 41 suddenly reduces the secondary pressure, causing a large shift shock. Such phenomenon often occurs when the pressure regulating valve 33 is stuck especially the case where the oil temperature is low and the oil viscosity is high, the case of upshift, and a similar case.

The upshift heightens the primary pressure and narrows the pulley groove of the primary pulley 11. Pulling the belt 13 to the primary pulley 11 side axially retreats the movable conical plate 12a of the secondary pulley 12, and the secondary pulley cylinder chamber 12c discharges the hydraulic pressure. At this time, in the pressure regulating valve 33, a part of the hydraulic pressure discharged from the secondary pulley cylinder chamber 12c is supplied to the feedback chamber 45 as the feedback pressure. This increases the pressing force by the feedback pressure more than the pressing force by the pilot pressure and the spring 46 and moves the spool 43 to the pilot chamber 44 side, thus decreasing the circulation area of the flow passage formed between the input port 40 and the output port 41. Accordingly, the above-described phenomenon is likely to occur during the upshift.

Figure 3:
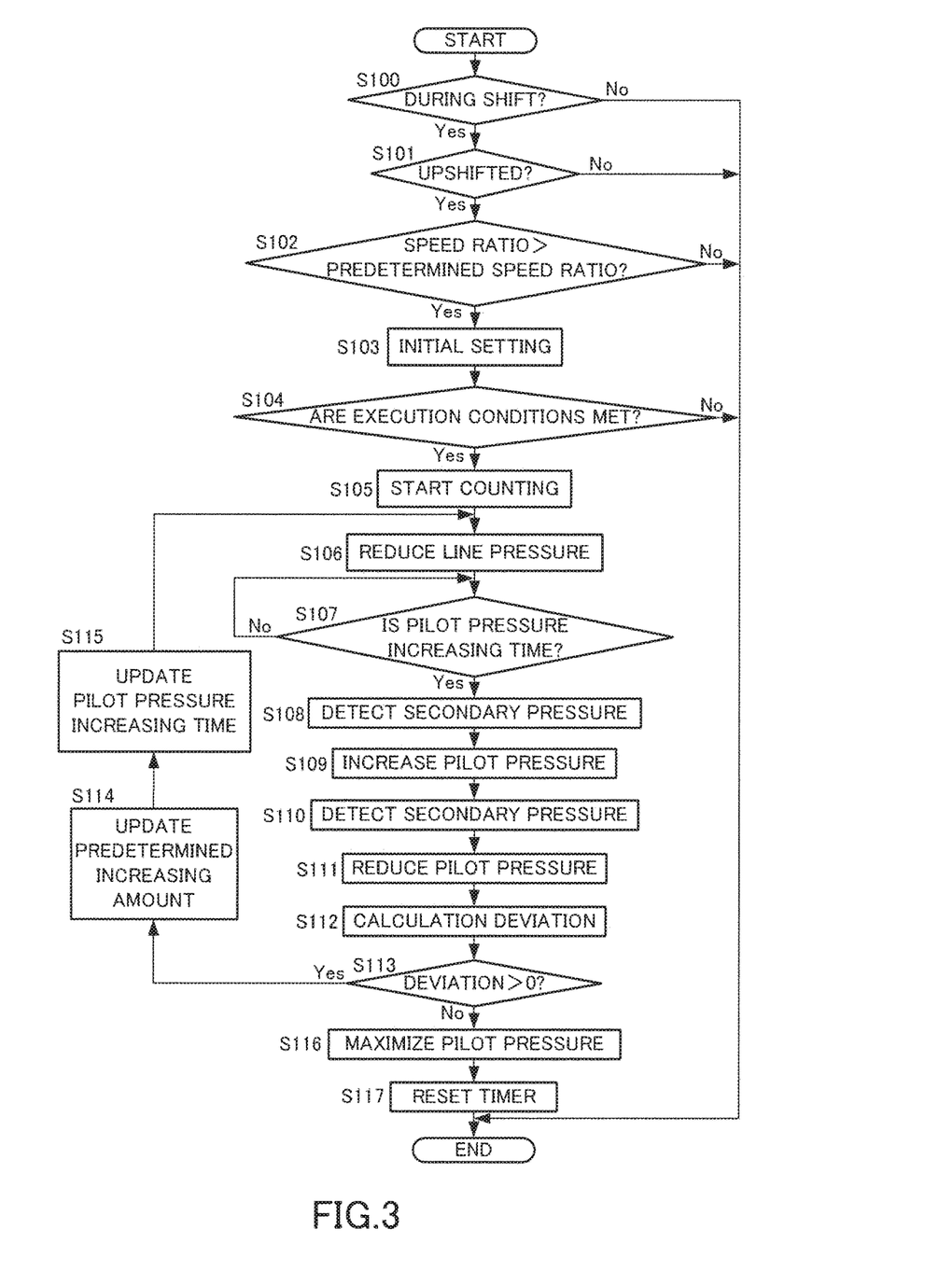
FIG. 3 is a flowchart describing an identical pressure control.

In view of this, this embodiment performs the identical pressure control described later. FIG. 3 is a flowchart describing the identical pressure control.

At Step S100, the CVTCU 20 determines whether the continuously variable transmission 10 is being shifted or not. When the continuously variable transmission 10 is being shifted, the process proceeds to Step S101, and when the continuously variable transmission 10 is not being shifted, this control terminates.

At Step S101, the CVTCU 20 determines whether the continuously variable transmission 10 is upshifted or not. When the continuously variable transmission 10 is upshifted, the process proceeds to Step S102, and when the continuously variable transmission 10 is downshifted, this control terminates.

At Step S102, the CVTCU 20 determines whether the speed ratio is larger than a predetermined speed ratio or not. The predetermined speed ratio is a preset speed ratio at which the secondary pressure becomes higher than the primary pressure, and is a speed ratio at which, for example, a throttle position becomes 3/8 or more. When the speed ratio is larger than the predetermined speed ratio, the process proceeds to Step S103, and when the speed ratio is the predetermined speed ratio or less, this control terminates.

At Step S103, the CVTCU 20 performs an initial setting in the identical pressure control. Specifically, a pilot pressure increasing time and a predetermined increasing value, which are described later, are set to an initial time and an initial increasing amount which are preset.

At Step S104, the CVTCU 20 determines whether execution conditions for identical pressure control are met or not. The CVTCU 20 determines that the execution conditions for identical pressure control are met in the case where, for example, the secondary pressure is higher than the set predetermined pressure and the engine rotation speed is higher than the set predetermined rotation speed, in addition to the conditions at Step 101 and Step S102. When the execution conditions for identical pressure control are met, the process proceeds to Step S105 and when the execution conditions for identical pressure control are not met, this control terminates.

At Step S105, the CVTCU 20 starts counting with a timer.

At Step S106, the CVTCU 20 reduces the line pressure. Specifically, the CVTCU 20 reduces the instructed pressure for line pressure by a predetermined amount of reduction per unit time to reduce the line pressure. The predetermined amount of reduction is preset. This gradually reduces the line pressure.

At Step S107, the CVTCU 20 determines whether the count by the timer reaches the pilot pressure increasing time or not. The pilot pressure increasing time is initial time set a Step S103 from the start of reducing the line pressure until an update at Step S115, which will be described later. After updated at Step S115, which will be described later, the pilot pressure increasing time is the updated time. When the count reaches the pilot pressure increasing time, the process proceeds to Step S108.

At Step S108, the CVTCU 20 detects the secondary pressure on the basis of the signal from the secondary pressure sensor 29.

At Step S109, the CVTCU 20 adds the predetermined increasing amount to a basic pilot pressure (set pressure) to increase the pilot pressure. The basic pilot pressure is preset pilot pressure in the case where the identical pressure control is not performed. The predetermined increasing amount is a value set so as to increase the circulation area of the flow passage formed between the input port 40 and the output port 41. For example, in the case where the input port 40 and the output port 41 are not communicated, at least the input port 40 and the output port 41 are communicated. In the case where the input port 40 and the output port 41 have already communicated, the predetermined increasing amount is a value with which the circulation area is further increased. Specifically, the predetermined increasing amount is the initial increasing amount set at Step S103 from the start of reducing the line pressure until an update at Step S114, which will be described later, and is the updated increasing amount after the update at Step S114, which will be described later. It should be noted that, the predetermined increasing amount may be corrected on the basis of the oil temperature detected by the oil temperature sensor 25. In this case, a lower oil temperature increases the predetermined increasing amount.

At Step S110, the CVTCU 20 detects the secondary pressure when the pilot pressure is increased on the basis of the signal from the secondary pressure sensor 29.

At Step S111, the CVTCU 20 reduces the pilot pressure and sets the pilot pressure as the basic pilot pressure.

In this embodiment, the pilot pressure is temporarily increased at Step S109 to Step S111 and detects the secondary pressure at the time. When the line pressure is higher than the secondary pressure, increasing the circulation area of the flow passage formed between the input port 40 and the output port 41 temporarily increases the secondary pressure.

At Step S112, the CVTCU 20 calculates a deviation between the secondary pressure with the pilot pressure temporarily increased and the secondary pressure before the increase.

At Step S113, the CVTCU 20 determines whether the deviation is larger than zero or not. That is, the CVTCU 20 determines whether the secondary pressure has increased or not with the temporarily increased pilot pressure. When the deviation is larger than zero, the process proceeds to Step S114, and when the deviation is zero or less, the process proceeds to Step 116. It should be noted that, a predetermined amount accommodating the variation may be set, the deviation and the predetermined amount are compared, and the determination here may be performed.

At Step S114, the CVTCU 20 converts the deviation into the pilot pressure and updates the converted value as the predetermined increasing amount. The CVTCU 20 updates the predetermined increasing amount in the case of temporarily increasing the next pilot pressure on the basis of the deviation.

At Step S115, the CVTCU 20 updates the next pilot pressure increasing time. Specifically, the CVTCU 20 sets an estimated line pressure assuming that the line pressure becomes a maximum secondary pressure when the pilot pressure is temporarily increased and calculates time until when a predicted line pressure at which the estimated line pressure is reduced by a predetermined reducing amount becomes identical to the secondary pressure before the temporal increase in the pilot pressure. Then, the calculated time is added to the currently set pilot pressure increasing time, thus updating the pilot pressure increasing time. Accordingly, at the subsequent process, when the count by the timer reaches the updated pilot pressure increasing time, the pilot pressure is temporarily increased.

At Step S116, the CVTCU 20 sets the pilot pressure as the maximum pilot pressure and maximizes the circulation area of the flow passage formed between the input port 40 and the output port 41. This supplies the line pressure to the secondary pulley cylinder chamber 12c without the reduction in pressure by the pressure regulating valve 33.

At Step S117, the CVTCU 20 resets the timer.

It should be noted that, the identical pressure control sets the pilot pressure to the maximum pilot pressure and then once reduces the instructed pressure for line pressure. Then, the identical pressure control confirms that the secondary pressure reduces together with the instructed pressure for line pressure, thus confirming the line pressure being identical to the secondary pressure.

Figure 4:
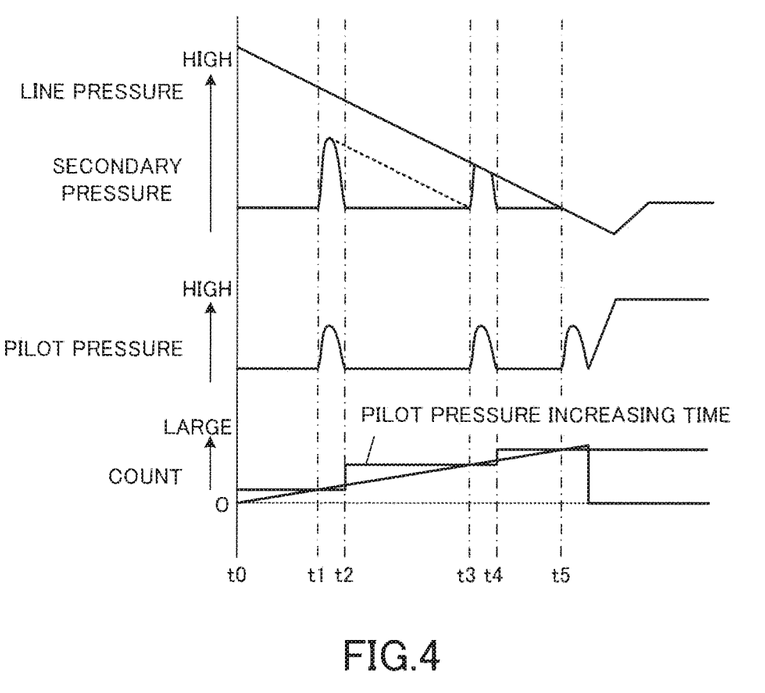
FIG. 4 is a timing chart describing the identical pressure control.

The following describes the identical pressure control with reference to the timing chart in FIG. 4.

The identical pressure control starts at time t0 to reduce the line pressure and to start counting by the timer.

When the count by the timer reaches the pilot pressure increasing time at time t1, the pilot pressure temporarily increases. Since the line pressure is higher than the secondary pressure, the pilot pressure temporarily heightens. The increase in the circulation area of the flow passage formed between the input port 40 and the output port 41 temporarily heightens the secondary pressure.

At time t2, the maximum secondary pressure with the temporarily increased pilot pressure is set as the estimated line pressure. As indicated by the dashed lines in FIG. 4, time when the predicted line pressure at which the estimated line pressure is reduced by the predetermined reducing amount is equal to the secondary pressure is calculated, thus updating the next pilot pressure increasing time.

At time t3, when the count by the timer reaches the updated pilot pressure increasing time, the pilot pressure is temporarily increased again. Since the line pressure is higher than the secondary pressure, the secondary pressure heightens. However, here, the line pressure reduces, and the secondary pressure does not become higher than the line pressure. Accordingly, even if the circulation area of the flow passage formed between the output port 41 and the input port 40 is increased, the increase in the secondary pressure is restricted.

At time t4, the next pilot pressure increasing time is updated. Here, the estimated line pressure and the actual line pressure match, and both the predicted line pressure and the actual line pressure reduce by the predetermined reducing amount. Accordingly, the pilot pressure increasing time updated on the basis of the predicted line pressure at the time t4 becomes time at which the line pressure and the secondary pressure are actually equal.

At time t5, when the count by the timer reaches the updated pilot pressure increasing time, the pilot pressure is temporarily increased again. Since the line pressure and the secondary pressure become identical, the temporal increase in the pilot pressure does not heighten the secondary pressure. Afterwards, the pilot pressure is set to the maximum pilot pressure, and the count by the timer is reset. Once reducing and then increasing the instructed pressure for line pressure reduces and increases the secondary pressure together with the line pressure.

The following describes effects of the embodiment of the present invention.

When the identical pressure control configures the line pressure and the secondary pressure to be identical, temporarily heightening the pilot pressure from the basic pilot pressure allows removing the stuck state of the pressure regulating valve 33, which occurs, for example, in the case of the low oil temperature and the small circulation area of the flow passage formed between the input port 40 and the output port 41. This ensures restraining the increase in the circulation area of the flow passage formed between the input port 40 and the output port 41 after the increase in the pressure difference between the line pressure and the secondary pressure, thus allowing restraining the variation of the secondary pressure and restraining the shift shock due to the variation.

When the deviation between the secondary pressure with the temporarily increased pilot pressure and the secondary pressure before the increase is zero or less, it is determined that the line pressure and the secondary pressure become identical. In the case of reduction in the line pressure and the deviation between the line pressure and the secondary pressure being zero or less, it can be determined that at least the line pressure reduces for the identical pressure control. Therefore, even if the circulation area of the flow passage formed between the input port 40 and the output port 41 becomes large at this timing, the variation of the secondary pressure can be decreased, thereby ensuring restraining the shift shock.

The delay of the next pilot pressure increasing time lowers the line pressure more than the secondary pressure, possibly increasing the deviation between the secondary pressure and the line pressure. Thereafter, the temporal increase in pilot pressure suddenly reduces the secondary pressure and changes the speed ratio, possibly increasing the shift shock. The temporal increase in pilot pressure temporarily increases the secondary pressure, and the speed ratio is temporarily changed to the Low side; therefore, the less number of temporal increases in the pilot pressure is preferable. This embodiment sets the maximum secondary pressure when the pilot pressure is temporarily increased as the estimated line pressure. Setting the next pilot pressure increasing time on the basis of the estimated line pressure and the predetermined reducing amount of the instructed pressure for line pressure ensures preventing a delay of the next pilot pressure increasing time, allowing preventing the shift shock due to the delay of the pilot pressure increasing time. While the number of changes in the speed ratio to the Low side is reduced, the timing at which the line pressure becomes equal to the secondary pressure can be obtained. This allows restraining the shift shock when the circulation area of the flow passage formed between the input port 40 and the output port 41 is increased.

Time when the predicted line pressure at which the estimated line pressure is reduced by the predetermined reducing amount is equal to the secondary pulley pressure is set as the next pilot pressure increasing time. This ensures obtaining timing when the line pressure is equal to the secondary pressure. This allows restraining the shift shock when the circulation area of the flow passage formed between the input port 40 and the output port 41 is increased.

In the pressure regulating valve 33, a part of the secondary pressure acts as the feedback pressure, and the spool 43 moves on the basis of the feedback pressure and the pilot pressure. With such pressure regulating valve 33, a part of the secondary pressure discharged from the secondary pulley cylinder chamber 12c at the upshift acts as the feedback pressure and the output port 41 communicates with the drain port 42. Accordingly, even if the line pressure is reduced for execution of the identical pressure control, the pressure regulating valve 33 is stuck. The secondary pressure detected by the secondary pressure sensor 29 does not reduce according to the line pressure and an erroneous determination that the line pressure does not reduce is made. Then, the instructed pressure for line pressure further reduces, increasing the pressure difference between the secondary pressure and the line pressure. Afterwards, when the input port 40 communicates with the output port 41, the variation of the secondary pressure increases, causing the large shift shock. In contrast to this, execution of the identical pressure control of this embodiment ensures removing the stuck state of the pressure regulating valve 33. This restrains the variation of the secondary pressure when the input port 40 communicates with the output port 41, ensuring restraining the large shift shock due to the variation.

The embodiments of the present invention described above are merely illustration of some application examples of the present invention and not of the nature to limit the technical scope of the present invention to the specific constructions of the above embodiments.

When increasing the instructed pressure for line pressure is required, the embodiment may stop the count by the timer to delay the next pilot pressure increasing time on the basis of time at which the instructed pressure for line pressure increases. This ensures reducing the number of temporal increases in the pilot pressure.

The embodiment may compare the predicted line pressure according to the count by the timer with the actual secondary pressure and may temporarily increase the pilot pressure at a timing when the predicted line pressure becomes the actual secondary pressure. This also ensures obtaining the similar effect.

The embodiment sets the next pilot pressure increasing time using the timer. The next pilot pressure increasing time may be set on the basis of the increasing amount of the secondary pressure with the temporally increased pilot pressure. Specifically, time when the instructed pressure for line pressure reduces by the increasing amount of the secondary pressure from the instructed pressure for line pressure at the pilot pressure increasing time of this time is defined as the pilot pressure increasing time, thus temporarily increasing the pilot pressure. This ensures reducing the number of temporal increases in the pilot pressure.

The embodiment temporarily increases the pilot pressure and determines that the line pressure and the secondary pressure are identical when the deviation is zero or less. When the speed ratio is not changed to the Low side with the temporarily increased pilot pressure, it may be determined that the line pressure and the secondary pressure becomes identical. This also allows the determination on whether the line pressure and the secondary pressure are identical or not.

The embodiment describes the identical pressure control that configures the line pressure and the secondary pressure to be identical. The control may be applied to configure the line pressure and the primary pressure to be identical.

It should be noted that, a chain continuously variable shift or a similar shift may employ the identical pressure control. The pressure regulating valve that communicates the input port with the output port by reduction in the pilot pressure may be used. In the case, the identical pressure control temporarily reduces the pilot pressure.

The present application claims a priority based on Japanese Patent Application No. 2014-30506 filed with the Japan Patent Office on Feb. 20, 2014, all the contents of which are hereby incorporated by reference.

The invention claimed is:

1. A hydraulic control device for controlling hydraulic pressure supplied to a continuously variable transmission configured by stretching a power transmission member between a first pulley and a second pulley, the hydraulic control device comprising:
   a pressure regulating valve that includes an input port to which line pressure is input, an output port, a drain port, and a spool, the output port being configured to supply an oil chamber of the second pulley with a second pulley pressure, the drain port being configured to discharge the second pulley pressure from the oil chamber, the spool moving according to pilot pressure to regulate the second pulley pressure;
   a solenoid valve configured to control the pilot pressure;
   a controller configured to control the line pressure on the basis of the second pulley pressure and first pulley pressure of the first pulley,
   the controller being configured to temporarily change the pilot pressure from set pressure to configure the line pressure identical to the second pulley pressure.

2. The hydraulic control device according to claim 1, wherein
   the controller is configured to temporarily heighten the pilot pressure from the set pressure.

3. The hydraulic control device according to claim 1, wherein
   the controller configured to determine that the line pressure and the second pulley pressure are identical in the case where an increasing amount of the second pulley pressure is lower than a predetermined amount when the controller temporarily heightens the pilot pressure from the set pressure to increase a circulation area of a flow passage formed between the input port and the output port.

4. The hydraulic control device according to claim 3, wherein
   the controller is configured to set next pilot pressure increasing time on the basis of maximum pressure of the second pulley pressure when the second pulley pressure heightens and a predetermined reducing amount of instructed pressure for the line pressure, when the circulation area is increased and the second pulley pressure heightens.

5. The hydraulic control device according to claim 4, wherein
   the controller is configured to set the maximum pressure as estimated line pressure, the controller being configured to set time when a predicted line pressure is equal to the second pulley pressure as the next pilot pressure increasing time, the predicted line pressure being pressure at which the estimated line pressure is reduced by the predetermined reducing amount.

6. The hydraulic control device according to claim 4, wherein
   the controller is configured to delay the next pilot pressure increasing time by a time at which the instructed pressure for the line pressure heightens when the instructed pressure for the line pressure heightens.

7. The hydraulic control device according to claim 3, wherein
   the controller is configured to set next pilot pressure increasing time on the basis of the increasing amount of the second pulley pressure when the circulation area is increased and the second pulley pressure heightens.

8. The hydraulic control device according to claim 7, wherein
   the controller is configured to temporarily heighten the pilot pressure from the set pressure when the instructed pressure for the line pressure reduces by the increasing amount.

9. The hydraulic control device according to claim 1, wherein
   the controller configured to determine that the line pressure and the second pulley pressure are identical in the case where increasing a circulation area, the circulation area being a circulation area of a flow passage formed between the input port and the output port, does not change a speed ratio when the controller temporarily heightens the pilot pressure from the set pressure to increase the circulation area.

10. The hydraulic control device according to claim 1, wherein
    in the pressure regulating valve, the second pulley pressure acts as feedback pressure, the spool moving on the basis of the pilot pressure and the feedback pressure.

11. A control method for a hydraulic control device for controlling hydraulic pressure supplied to a continuously variable transmission configured by stretching a power transmission member between a first pulley and a second pulley, wherein
    the hydraulic control device includes:
    a pressure regulating valve including an input port to which line pressure is input, an output port, a drain port, and a spool, the output port being configured to supply an oil chamber of the second pulley with a second pulley pressure, the drain port being configured to discharge the second pulley pressure from the oil chamber, the spool moving according to pilot pressure to regulate the second pulley pressure; and a solenoid valve configured to control the pilot pressure, wherein the control method controls the line pressure on the basis of the second pulley pressure and first pulley pressure of the first pulley, the control method temporarily changing the pilot pressure from set pressure to configure the line pressure identical to the second pulley pressure.

12. A hydraulic control device for controlling hydraulic pressure supplied to a continuously variable transmission configured by stretching a power transmission member between a first pulley and a second pulley, the hydraulic control device comprising:

a pressure regulating valve that includes an input port to which line pressure is input, an output port, a drain port, and a spool, the output port being configured to supply an oil chamber of the second pulley with a second pulley pressure, the drain port being configured to discharge the second pulley pressure from the oil chamber, the spool moving according to pilot pressure to regulate the second pulley pressure;

a solenoid valve configured to control the pilot pressure;

line pressure control means for controlling the line pressure on the basis of the second pulley pressure and first pulley pressure of the first pulley; and hydraulic control means for temporarily changing the pilot pressure from set pressure to configure the line pressure identical to the second pulley pressure.

* * * * *